United States Patent
Moshchuk et al.

(10) Patent No.: US 8,527,172 B2
(45) Date of Patent: Sep. 3, 2013

(54) VEHICLE COLLISION AVOIDANCE AND WARNING SYSTEM

(75) Inventors: Nikolai K. Moshchuk, Grosse Pointe, MI (US); Shih-Ken Chen, Troy, MI (US); Chad T. Zagorski, Clarkston, MI (US); Aamrapali Chatterjee, Okemos, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 381 days.

(21) Appl. No.: 12/908,699

(22) Filed: Oct. 20, 2010

(65) Prior Publication Data

US 2012/0101701 A1  Apr. 26, 2012

(51) Int. Cl.
B60T 7/12 (2006.01)

(52) U.S. Cl.
USPC ............................... 701/70; 701/48

(58) Field of Classification Search
USPC ............. 701/36, 41, 44, 45, 48, 70, 300–302, 701/78, 80, 82, 90, 91; 180/167–169, 274, 180/275
See application file for complete search history.

(56) References Cited

U.S. PATENT DOCUMENTS

| | | | |
|---|---|---|---|
| 5,699,040 A | 12/1997 | Matsuda | |
| 6,157,892 A | 12/2000 | Hada et al. | |
| 6,269,308 B1 | 7/2001 | Kodaka et al. | |
| 6,567,748 B2 | 5/2003 | Matsuno | |
| 6,574,559 B2 | 6/2003 | Shinmura et al. | |
| 6,624,747 B1 | 9/2003 | Friederich et al. | |
| 6,813,562 B2 | 11/2004 | Altan et al. | |
| 6,889,786 B2 | 5/2005 | Watanabe et al. | |
| 6,926,374 B2 | 8/2005 | Dudeck et al. | |
| 7,016,783 B2 | 3/2006 | Hac et al. | |
| 7,493,200 B2 | 2/2009 | Takahashi et al. | |
| 7,689,359 B2 * | 3/2010 | Tokoro et al. | 701/301 |
| 7,890,231 B2 * | 2/2011 | Saito et al. | 701/41 |
| 2005/0125153 A1 * | 6/2005 | Matsumoto et al. | 701/300 |
| 2009/0132125 A1 * | 5/2009 | Yonezawa et al. | 701/41 |
| 2009/0212930 A1 * | 8/2009 | Pfeiffer et al. | 340/435 |
| 2009/0322500 A1 | 12/2009 | Chatterjee et al. | |
| 2010/0006363 A1 * | 1/2010 | Zagorski | 180/275 |
| 2011/0044507 A1 * | 2/2011 | Strauss et al. | 382/103 |
| 2011/0071731 A1 * | 3/2011 | Eidehall et al. | 701/42 |
| 2011/0082623 A1 * | 4/2011 | Lu et al. | 701/41 |

FOREIGN PATENT DOCUMENTS

WO  WO 90/02985  3/1990

* cited by examiner

Primary Examiner — Khoi Tran
Assistant Examiner — Jason Holloway
(74) Attorney, Agent, or Firm — John A. Miller; Miller IP Group, PLC

(57) ABSTRACT

A collision avoidance system in a host vehicle that employs combined automatic braking and steering. The collision avoidance system defines thresholds that identify a time to collision with a target vehicle by the host vehicle that are based on the speed of the host vehicle, the acceleration of the host vehicle, the speed of the target vehicle, the acceleration of the target vehicle, the distance to the target vehicle from the host vehicle and a coefficient of friction of the roadway. The collision avoidance system provides full automatic collision avoidance braking if the time to collision is less than one threshold and the lane adjacent to the host vehicle is not clear. The collision avoidance system provides both automatic steering and braking of the host vehicle if the time to collision is less than another threshold and the lane adjacent to the host vehicle is clear.

14 Claims, 5 Drawing Sheets

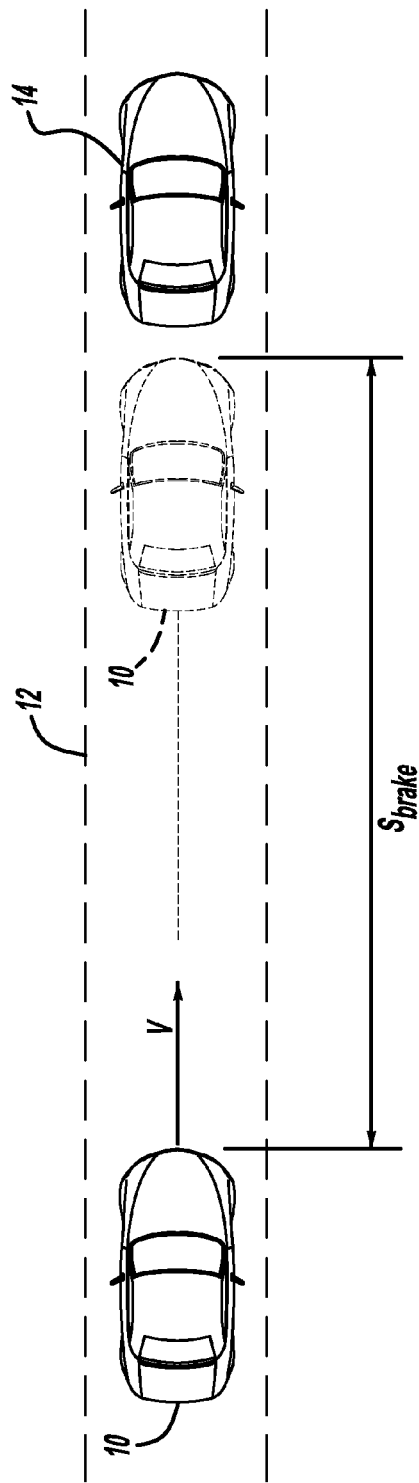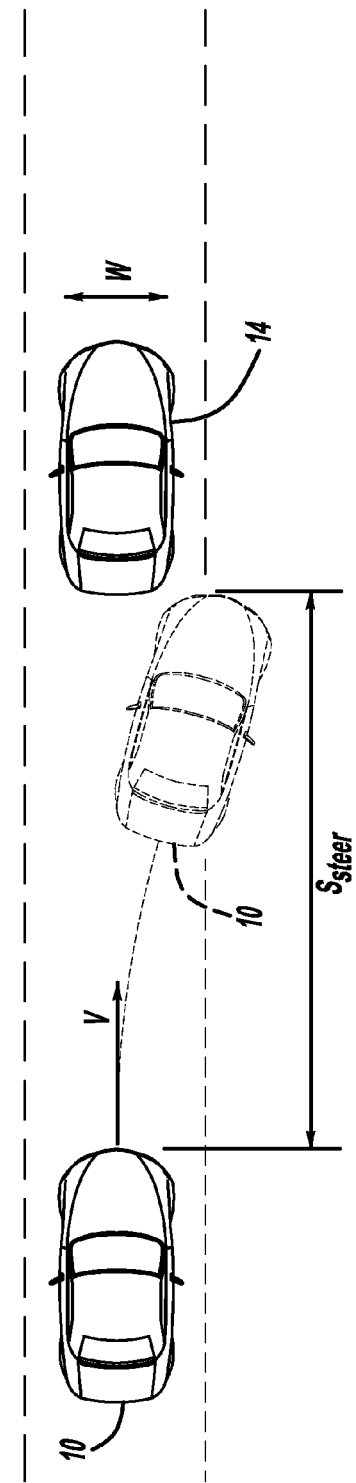

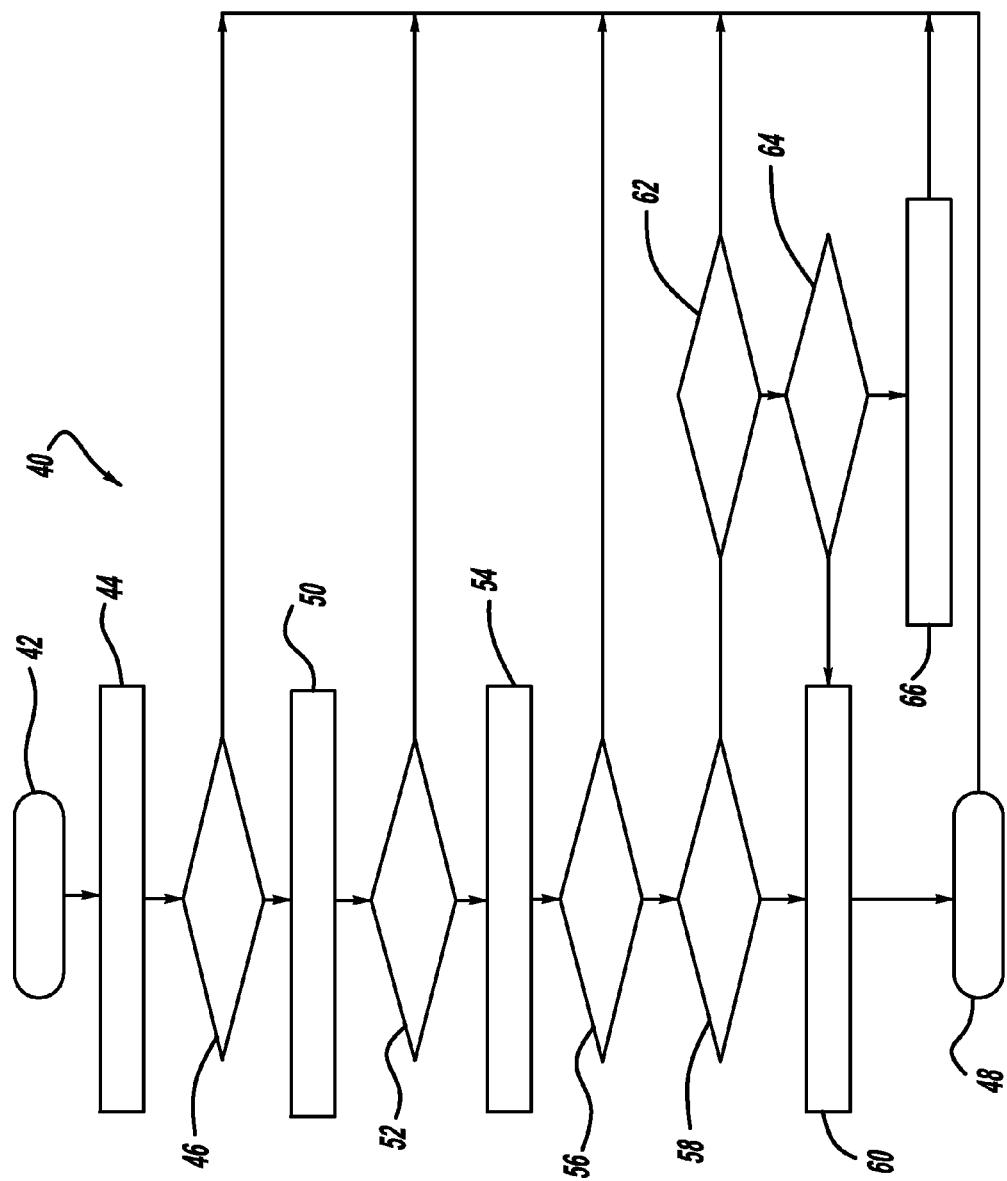

VEHICLE COLLISION AVOIDANCE AND WARNING SYSTEM

BACKGROUND OF THE INVENTION

1. Field of the Invention

This invention relates generally to a collision avoidance system for a vehicle and, more particularly, to a collision avoidance system for a vehicle that provides combined braking and steering.

2. Discussion of the Related Art

Collision avoidance systems and/or adaptive cruise control systems are known in the art that provide automatic vehicle control, such as braking, if a potential or imminent collision with another vehicle or object is detected, and also may provide a warning to allow the driver to take corrective measures to prevent the collision. For example, adaptive cruise control systems are known that employ a forward looking sensor, such as a radar or lidar sensor, that provides automatic speed control and/or braking if the vehicle is approaching another vehicle. Also, collision avoidance systems are known that employ sensors for determining if a collision with an object may be imminent that may provide vehicle braking even if the vehicle operator is controlling the vehicle.

These types of systems typically employ long-range sensors that have a narrow field-of-view in the near-field of the vehicle. Particularly, the sensor signals emanate from a point source on the vehicle and extend in the forward direction of the vehicle, typically to about 150 meters. The collision warning system transmits a radar or laser beam forward of the vehicle and process reflections from objects in the path of the vehicle. The system generates measurements from the reflections and assesses the potential for a collision based on the vehicle's speed, direction relative to the objects, road surface conditions, etc. The alert can be a visual indication on the vehicles instrument panel or in a head-up display (HUD), and/or can be an audio warning or other haptic feedback device, such as seat shaking.

Heretofore, collision avoidance systems have typically been limited to systems that provide automatic braking in the event that the vehicle driver does not take evasive action in time to prevent a collision. However, collision avoidance systems of this type may benefit from providing combined braking and steering to avoid a collision.

SUMMARY OF THE INVENTION

In accordance with the teachings of the present invention, a collision avoidance system in a host vehicle is disclosed that employs combined automatic braking and steering. The collision avoidance system defines first, second, third and fourth thresholds that identify a time to collision with a target vehicle by the host vehicle that are based on the speed of the host vehicle, the acceleration of the host vehicle, the speed of the target vehicle, the acceleration of the target vehicle, the distance to the target vehicle from the host vehicle and a coefficient of friction of the roadway on which the host vehicle and the target vehicle are traveling, where the first threshold is greater than the second threshold, the second threshold is greater than the third threshold and the third threshold is greater than the fourth threshold. The collision avoidance system determines if the time to collision is less than the first threshold, and if so, initiates a collision warning. The collision avoidance system also determines if the time to collision is less than the second threshold if the time to collision is less than the first threshold, and if so, provides limited automatic braking of the host vehicle. The collision avoidance system also determines if the time to collision is less than the third threshold if the time to collision is less than the second threshold, and if so, check the condition of whether a roadway lane adjacent to the host vehicle is clear. The collision avoidance system provides full automatic collision avoidance braking if the time to collision is less than the third threshold and the lane adjacent to the host vehicle is not clear. The collision avoidance system also determines if the time to collision is less than the fourth threshold if the time to collision is less than the third threshold and the lane adjacent to the host vehicle is clear. The collision avoidance system provides both automatic steering and braking of the host vehicle if the time to collision is less than the fourth threshold and the lane adjacent to the host vehicle is clear.

Additional features of the present invention will become apparent from the following description and appended claims, taken in conjunction with the accompanying drawings.

BRIEF DESCRIPTION OF THE DRAWINGS

FIG. 1 is an illustration of a host vehicle following a target vehicle on a roadway showing a braking distance;

FIG. 2 is the illustration shown in FIG. 1 showing a steering distance and the host vehicle taking an evasive steering maneuver to prevent a collision with the target vehicle;

FIG. 4 is a flow chart diagram showing a process for taking evasive maneuvers in the host vehicle to avoid a collision with the target vehicle;

DETAILED DESCRIPTION OF THE EMBODIMENTS

The following discussion of the embodiments of the invention directed to a collision avoidance system that employs combined braking and steering is merely exemplary in nature, and is in no way intended to limit the invention or its applications or uses.

As will be discussed in detail below, the present invention proposes an enhanced collision avoidance (ECA) system for a host vehicle that provides combined automatic braking and steering as a collision with a target vehicle becomes imminent. Although the discussion herein concerns a potential collision of a host vehicle with a target vehicle, the ECA system being discussed has application for a potential collision with any object in front of the host vehicle. The system will provide some type of warning to the driver of the host vehicle as a collision with the target vehicle becomes more probable, and if the driver fails to take evasive action, the collision avoidance system will automatically provide either braking alone, steering alone, or combined braking and steering. Particularly, the ECA system will determine collision judgment lines relative to a time to collision based on various parameters, including vehicle speed, vehicle acceleration, vehicle weight, road coefficient of friction, etc., for providing optimal braking and steering to provide collision avoidance. If the driver fails to initiate a collision avoidance maneuver after an alert is given, the collision avoidance system will automatically provide evasive maneuvering including braking and/or steering if the adjacent lane is clear. A steering maneuver will only automatically be provided if the speed of the host vehicle is above a predetermined speed threshold.

FIG. 1 is an illustration of a host vehicle 10 traveling on a roadway 12 following a target vehicle 14. As the host vehicle 10 approaches the target vehicle 14 at a speed where a collision will occur if no changes are made, the ECA system will give audible warnings to the vehicle driver to take evasive action, and if none are taken, the collision avoidance may automatically initiate vehicle braking as long as the distance s from the subject vehicle 10 to the target vehicle 14 is greater than a calculated braking distance $s_{brake}$ where braking can be effectively provided to prevent the collision.

If the speed of the host vehicle 12 and the distance s between the host vehicle 12 and the target vehicle 14 becomes too short, the collision avoidance system may then provide automatic steering if the distance s approaches a calculated steering threshold $s_{steer}$, where $s_{steer} < s_{brake}$. If the distance s between the host vehicle 10 and the target vehicle 14 is so short based on the parameters referred to above, then combined braking and steering may be required. The automatic steering will be provided only if the speed of the host vehicle 10 is above a predetermined speed, V>V*, where V* may be 11 m/sec for high friction roadway surfaces.

Figure 3:
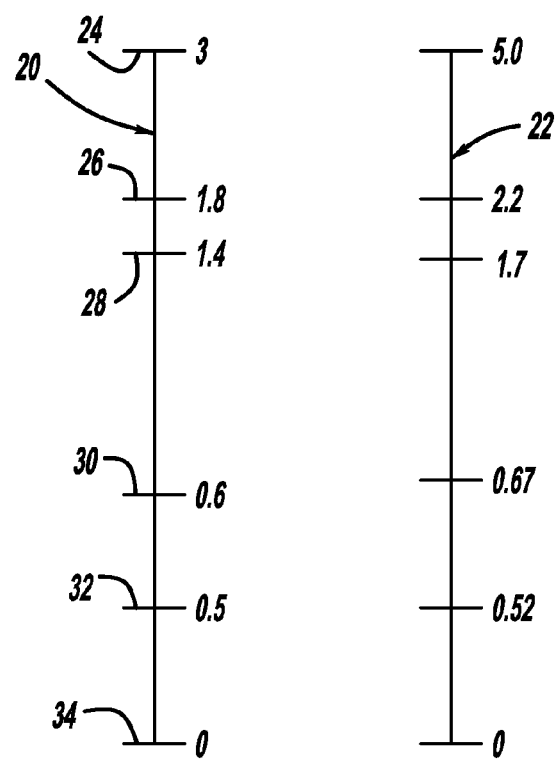
FIG. 3 is an illustration showing time in seconds for the host vehicle to take evasive maneuvers to avoid a collision with the target vehicle, or other object, for two different vehicle speeds.

FIG. 3 illustrates two collision judgment lines based on a time to collision (TTC) with the target vehicle 14 for determining what action to be taken in the ECA system for two different vehicle speeds. Particularly, collision judgment line 20 is for a host vehicle speed $V_h$, of 10.8 m/sec and collision judgment line 22 is for a host vehicle speed $V_h$ of 20 m/sec. Of course, the values discussed below are vehicle dependent in that different types, sizes, etc. of vehicles will have different collision judgment lines because of their width, weight, performance, handling, etc. Also, as the vehicle speed V changes during the particular time line as a result of braking or other, action, the various times will change. The time to collision (TTC) is a non-linear function of distance d to the target vehicle 14, velocity $V_h$ of the host vehicle 10, velocity $V_t$ of the target vehicle 14, acceleration $A_h$ of the host vehicle 10 and acceleration $A_t$ of the target vehicle 14. The prediction of the host and target vehicle motion is based on the assumption that the host vehicle acceleration $A_h$ and the target vehicle acceleration $A_t$ are both constant in the near future. The actuation delay for both braking and steering is included.

At line 24, a first threshold Th1 is reached where 90% of drivers will initiate some evasive maneuver including braking and/or steering to avoid colliding with the target vehicle 14. For the line 20, the time to collision is about 3 seconds and for the line 22, the time to collision is about 5 seconds. At line 26, a second threshold Th2 is reached where 95% of the drivers will initiate hard braking or steering to avoid a collision with the target vehicle 14. For the line 20, the time to collision is about 1.8 seconds and for the line 22 the time to collision is about 2.2 seconds. The ECA system will be initiating some type of alert during this time frame between the lines 24 and 26 to notify the driver that a potential collision could occur. Line 28 represents the last chance to avoid the collision by hard braking, and is about 1.4 seconds to collision for the line 20 and about 1.7 seconds to collision for the line 22. Once this time frame has passed, then steering only or a combination of braking and steering can prevent the collision. At line 30, a third threshold Th3 is reached, which is the last chance to avoid the collision by steering only. For the line 20, the time to collision is about 0.6 seconds to collision and for the line 22, the time to collision is about 0.67 seconds. After the third threshold Th3 has been passed, then only combined braking and steering can prevent the collision. The last chance to avoid the collision by providing combined braking and steering is at line 32 defined by a fourth threshold Th4 and is about 0.5 seconds to collision for both of the lines 20 and 22.

FIG. 4 is a flow chart diagram 40 that illustrates an algorithm for providing the braking and/or steering discussed above in the ECA system using the thresholds Th1, Th2, Th3 and Th4. The algorithm starts at box 42, and based on the various parameters, including the host vehicle speed $V_h$, the target vehicle speed $V_t$, the host vehicle acceleration $A_h$, the target vehicle acceleration $A_t$, the distance d to the target vehicle 14 and the roadway coefficient of friction µ, the algorithm calculates the thresholds Th1, Th2, Th3 and Th4 at box 44. The algorithm then determines if the time to collision with the target vehicle 14 is less than the first threshold Th1 at decision diamond 46, and if not, the algorithm exits at box 48 and then returns to the start box 42. If the time to collision is less than the first threshold Th1 at the decision diamond 46, then the algorithm issues a collision warning at box 50, and then determines whether the time to collision is less than the second threshold Th2 at decision diamond 52. If the time to collision is not less than the second threshold Th2 at the decision diamond 52, then the algorithm exits at the box 48 while still issuing the collision warning, and returns to the start box 42 to begin the process over.

If the time to collision is less than the second threshold Th2 at the decision diamond 52, then the algorithm provides limited automatic braking at box 54, and then determines whether the time to collision is less than the third threshold Th3 at decision diamond 56. The automatic braking at the box 54 is not full collision avoidance braking, but is light braking that will serve as a further warning in addition to the audible alert that is currently being given. In addition, this braking will provide a bit more time for the driver to initiate an avoidance maneuver. If the time to collision is not less than the third threshold Th3 at the decision diamond 56, the algorithm exits the process at the exit box 48 while still providing the automatic braking, where the algorithm will again start the collision avoidance process at the box 42.

If the time to collision is less than the third threshold Th3 at the decision diamond 56 then automatic steering may be provided. The algorithm determines whether the lane adjacent to the target vehicle 14 and the host vehicle 10 is available at decision diamond 58 in preparation to provide automatic steering. If the adjacent lane is not available at the decision diamond 58, then the algorithm provides a hard autonomous collision mitigation braking at box 60, and exits the algorithm at the box 48 to return to the process of determining collision avoidance at the start box 42. If the lane is available at the decision diamond 58, then the vehicle driver is still able to provide a steering maneuver to avoid the collision until the time to collision reaches the fourth threshold Th4. At decision diamond 62, the algorithm determines whether the time to collision is less than the threshold Th4 meaning that the vehicle driver can still avoid the collision by steering, and if not, the algorithm exits at the box 48 and returns to the start box 42. If the lane is available at the decision diamond 58, and the time to collision is less than the fourth threshold Th4 at the decision diamond 62, then the algorithm again determines whether the lane is available at decision diamond 64, and if not, provides the full autonomous collision mitigation braking at the box 60. If the lane is available at the decision diamond 64, then the algorithm causes the ECA system to perform both automatic combined steering and braking at box 66 to avoid the collision.

Threshold Th3 is determined based on whether the host vehicle 10 can still make a steering maneuver to avoid the collision with the target vehicle 14. Any suitable technique can be used to determine the threshold Th3, such as using a bicycle model to determine the center of rotation of the host vehicle 10. One suitable example for determining the threshold Th3 using such a bicycle model can be found in U.S. Patent Application Publication No. 2009/0322500, Judgment Line Calculations for a Vehicle Safety System, filed Jun. 25, 2008 assigned to the assignee of this application and herein incorporated by reference.

The optimal combined braking/steering judgment line to determine the threshold Th4 is based on a relationship between braking and steering where more braking requires less steering and more steering requires less braking. In one embodiment, the threshold Th4 is determined by:

$$Th4 = \frac{1}{2}\sqrt{\frac{s_1}{A_{x0}}} \ln \frac{V_h + \sqrt{A_{x0} s_1}}{V_h - \sqrt{A_{x0} s_1}} + \Delta t \quad (1)$$

Where $V_h$ is the host vehicle speed, $s_1$ is the distance needed for the steer away maneuver, $A_{x0}$, is the braking level in the beginning of the steer away maneuver, $\Delta t$ is the correction due to actuator delay.

In order to provide an optimal steering path in the ECA system for the host vehicle 10 to avoid the collision during a potential collision event, a strategy is employed for the combined braking and steering collision avoidance/-mitigation maneuver if the threshold Th4 has been reached. Because of the amount of math that needs to be used to calculate the optimal path of the host vehicle 10 during the potential collision event, some of the calculations are performed off-line and provided in a look-up table, as discussed below. The amount of braking necessary to avoid the collision changes linearly as the distance s traveled by the host vehicle 10 changes. The present invention proposes calculating off-line an optimization to minimize the gap between the host vehicle 10 and the target vehicle 14 to avoid the collision. This off-line optimization generates a two-dimensional table for providing optimal braking in the ECA system. The optimal braking is typically between 0.2-0.4 g depending on the host vehicle speed $V_h$ and the coefficient of friction μ of the roadway. The optimal braking is then calculated on-line during the potential collision event using the two-dimensional look-up table based on the current host vehicle speed $V_h$ and the roadway surface friction p. The optimal lateral acceleration for the automatic steering is calculated on-line based on the optimal braking and a tire friction ellipse.

Figure 5:
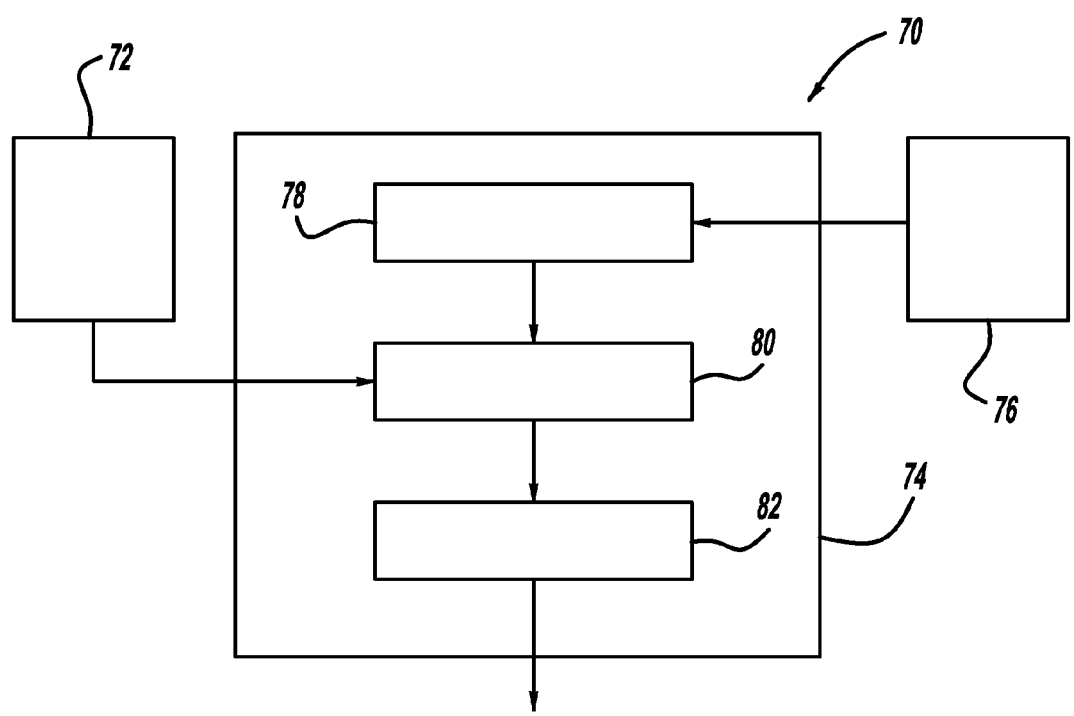
FIG. 5 is a block diagram of a system for determining an optimal vehicle path.

FIG. 5 is a block diagram of a system 70 that determines the optimal braking/steering path of the host vehicle 10 when performing the collision avoidance maneuver when the threshold Th4 has been reached. At box 72, the off-line optimization for the longitudinal deceleration (braking) $A_{x0}$ of the host vehicle 10 is generated and is provided as a two-dimensional table in a processor 74 on board the vehicle 10, as will be discussed below.

Figure 6:
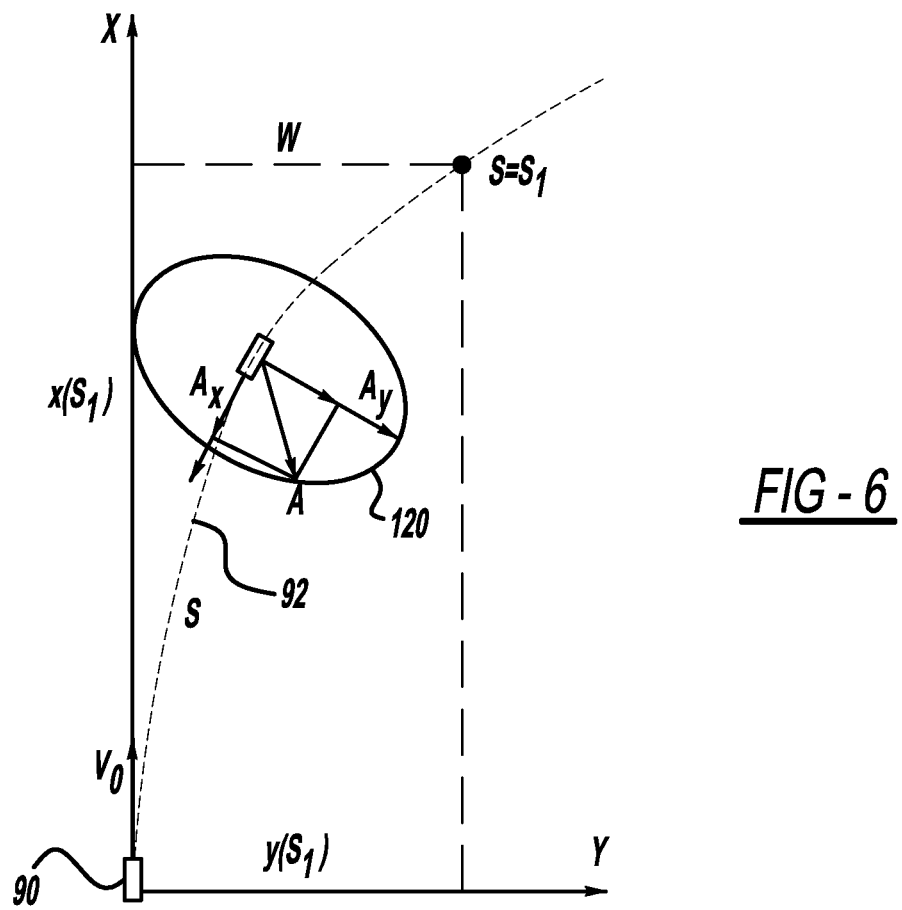
FIG. 6 is a graph showing a vehicle path for an optimal braking profile.

FIG. 6 is a graph for lateral y and longitudinal x distances for the discussion below where the center of gravity (CG) of the host vehicle 10 is at the origin 90 of the graph and the optimal path for braking and steering is shown by graph line 92. The optimization goal of the off-line braking calculations first finds the longitudinal deceleration $A_x(s)$ and the lateral acceleration $A_y(s)$ of the host vehicle 10 so that the distance $X(s_1)$ to the target vehicle shown by the graph is minimized. Here $0 \leq s \leq s_1$. The equations for the center of gravity (CG) in the distance s domain are:

$$x'' = \frac{A_y}{V_h^2} y' \quad (2)$$

$$y'' = -\frac{A_y}{V_h^2} x' \quad (3)$$

$$(V_h^2)' = 2A_x \quad (4)$$

The maximum steering by the host vehicle 10 is limited by the saturation of the tires on the vehicle 10. The constraint for the tire saturation limit is defined by:

$$\left(\frac{A_x}{A_x^{max}}\right)^2 + \left(\frac{A_y}{A_y^{max}}\right)^2 = 1 \quad (5)$$

Also, the ability to steer around the target vehicle 14 is based on the width w of the target vehicle 14. The constraint for the target vehicle width w is defined by:

$$y(s_1) = w \quad (6)$$

From these off-line calculations that determine the longitudinal deceleration $A_{x0}$, or braking, of the host vehicle 10, a two-dimensional table is developed that defines the proper braking $A_{x0}$ for a range of host vehicle speeds and roadway coefficients of frictions μ and identifies the distance $s_1$ necessary to complete the braking maneuver and avoid the collision.

Figure 7:
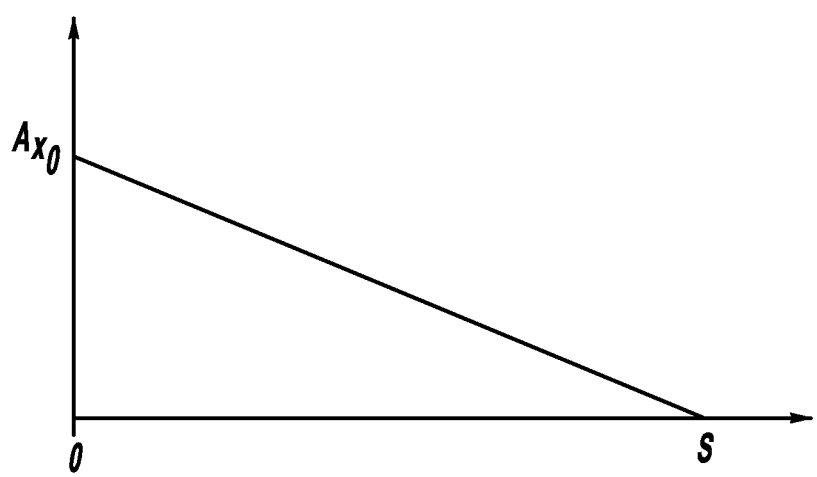
FIG. 7 is a graph with distance on the horizontal axis and braking on the vertical axis showing a linear relationship between optimal braking and a distance to avoid the target vehicle.

As discussed above, the relationship between the braking $A_x$ and the distance s provides a linear function from the vehicle speed $V_h$ and the roadway coefficient of friction μ. FIG. 7 is a graph with distance on the horizontal axis and braking on the vertical axis showing the linear relationship between the braking $A_x$ and the distance s.

At box 76, the vehicle 10 will also include algorithms for estimating or calculating the current longitudinal speed $V_x$ of the host vehicle and the coefficient of friction μ of the roadway 12. Many algorithms are known in the art that can provide these calculations. See, for example, U.S. patent application Ser. No. 12/841,769, titled Methods and Apparatuses for Determining Tire/Road Coefficient of Friction, filed Jul. 22, 2010, assigned to the assignee of this application, and herein incorporated by reference. During the optimal path calculation in the processor 74, the vehicle longitudinal speed $V_x$ and the coefficient of friction μ are read at box 78 from the estimation box 76. Next, the algorithm uses the look-up table to determine the optimal longitudinal deceleration (braking) $A_{x0}$, of the host vehicle 10 for the current speed and coefficient of friction values at box 80.

Figure 8:
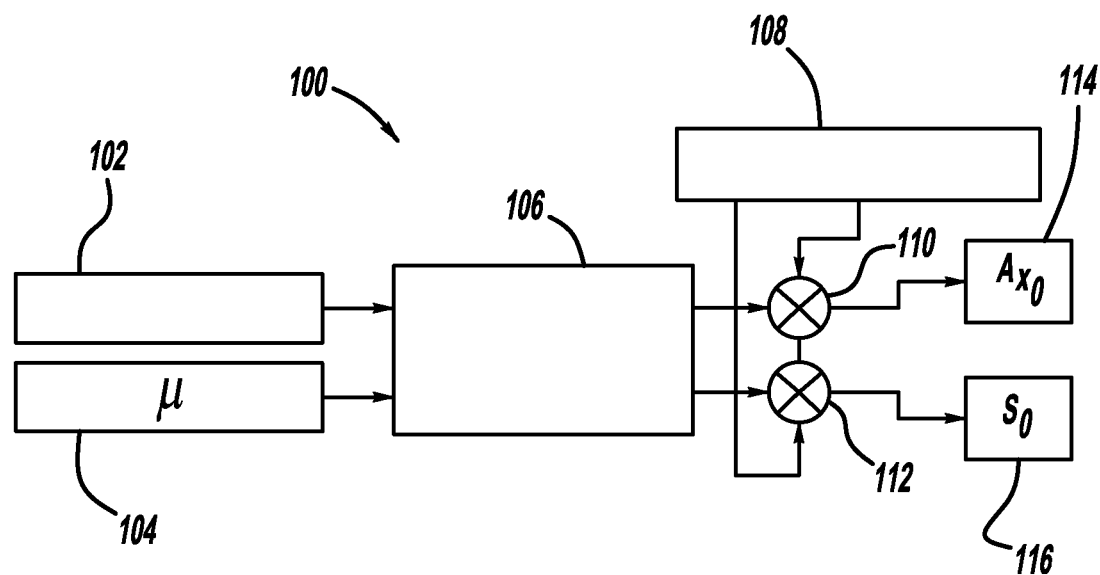
FIG. 8 is a block diagram of a system for calculating optimal braking and minimal distance.

From the two-dimensional look-up table, the optimal braking $A_x$ and distance s can be provided on-line during the collision avoidance maneuver. FIG. 8 is a block diagram of a system 100 where the host vehicle speed $V_h$ is provided at box 102 and the roadway coefficient of friction μ is provided at box 104. These values are applied to the look-up table at box 106 from the off-line calculation to get the optimal braking $A_x$ and the distance s for these values. The optimal braking $A_{x0}$ and the distance $s_1$ from the look-up table are adjusted by the width w of the target vehicle 14 from box 108 in junctions 110 and 112, respectively, to provide the desired braking $A_{x0}$ at box 114 and the desired distance $s_1$ at box 116.

The algorithm then uses the optimal braking $A_x$ and a friction ellipse at box 82 to calculate the optimal lateral acceleration (steering) $A_y$ of the host vehicle 10 to provide the desired path of the host vehicle 10 for the automatic steering to avoid the collision. For example, the optimal lateral acceleration $A_y$ is calculated based on a friction ellipse 120, shown in FIG. 6, where the lateral acceleration $A_y$ is calculated as:

$$\left(\frac{A_x}{A_x^{max}}\right)^2 + \left(\frac{A_y}{A_y^{max}}\right)^2 \leq 1 \tag{7}$$

$$A_y = A_y^{max}\sqrt{1-\left(\frac{A_x}{A_x^{max}}\right)^2} \tag{8}$$

As shown by the discussion above, the parameterized braking acceleration $A_x$ is a function of the traveled distance s, where the numerical solution of the differential equation of motion is defined. From this, the optimal braking $A_x(s)$ is a linear function of the distance s, the optimal braking decreases with distance and vanishes at the end of the steer-away maneuver, where $A_x(s_1)=0$, and the optimal braking depends on the initial speed $V_0$, surface friction μ and target vehicle width w.

The foregoing discussion disclosed and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for providing collision avoidance in a host vehicle, said method comprising:
    defining first, second, third and fourth thresholds that identify a time to collision with a target vehicle by the host vehicle that are based on a speed of the host vehicle, an acceleration of the host vehicle, a speed of the target vehicle, an acceleration of the target vehicle, a distance to the target vehicle from the host vehicle and a coefficient of friction of a roadway on which the host vehicle and the target vehicle are traveling, where the first threshold is greater than the second threshold, the second threshold is greater than the third threshold and the third threshold is greater than the fourth threshold;
    determining, in a processor, if the time to collision is less than the first threshold, and if so, initiating a collision warning;
    determining, in the processor, if the time to collision is less than the second threshold if the time to collision is less than the first threshold, and if so, providing limited automatic braking of the host vehicle;
    checking a condition of whether a roadway lane adjacent to the host vehicle is clear;
    determining, in the processor, if the time to collision is less than the third threshold if the time to collision is less than the second threshold;
    providing full automatic collision avoidance braking if the time to collision is less than the third threshold and the lane adjacent to the host vehicle is not clear;
    determining, in the processor, if the time to collision is less than the fourth threshold if the time to collision is less than the third threshold and the lane adjacent to the host vehicle is clear; and
    providing both automatic host vehicle steering and host vehicle braking in the host vehicle if the time to collision is less than the fourth threshold and the roadway lane adjacent to the host vehicle is clear.

2. The method according to claim 1 wherein the third threshold is determined based on a bicycle model and a degree of rotation of the host vehicle.

3. The method according to claim 1 wherein providing both automatic steering and braking includes providing optimal steering and braking where the steering is reduced as the braking is increased and the braking is reduced as the steering is increased.

4. The method according to claim 3 wherein the optimal braking is between 0.2 and 0.4 g.

5. The method according to claim 1 wherein providing both automatic steering and braking includes only providing automatic steering if the speed of the host vehicle is above a predetermined minimum vehicle speed.

6. The method according to claim 5 wherein the predetermined minimum vehicle speed is based on the coefficient of friction of the roadway.

7. The method according to claim 6 wherein the minimum vehicle speed is about 11 m/sec for relatively high coefficient of friction roadways.

8. The method according to claim 1 wherein initiating a collision warning includes initiating an audible warning.

9. The method according to claim 1 wherein providing limited automatic braking of the host vehicle includes providing a level of braking that is a only warning to a driver of the host vehicle.

10. A system for providing collision avoidance in a host vehicle, said system comprising:
    means for defining first, second, third and fourth thresholds that identify a time to collision with a target object by the host vehicle that are based on a speed of the host vehicle, an acceleration of the host vehicle, a speed of the target object, an acceleration of the target object, a distance to the target object from the host vehicle and a coefficient of friction of a roadway on which the host vehicle is traveling, where the first threshold is greater than the second threshold, the second threshold is greater than the third threshold and the third threshold is greater than the fourth threshold;
    means for determining if the time to collision is less than the first threshold, and if so, initiating a collision warning;
    means for determining if the time to collision is less than the second threshold if the time to collision is less than the first threshold, and if so, providing limited automatic braking of the host vehicle;
    means for checking a condition of whether a roadway lane adjacent to the host vehicle is clear;
    means for determining if the time to collision is less than a third threshold if the time to collision is less than the second threshold;
    means for providing full automatic collision avoidance braking if the time to collision is less than the third threshold and the lane adjacent to the host vehicle is not clear;
    means for determining if the time to collision is less than the fourth threshold if the time to collision is less than the third threshold and the lane adjacent to the host vehicle is clear; and
    means for providing both automatic host vehicle steering and host vehicle braking in the host vehicle if the time to collision is less than the fourth threshold and the roadway lane adjacent to the host vehicle is clear.

11. The system according to claim 10 wherein the means for providing both automatic steering and braking provides optimal steering and braking where the steering is reduced as the braking is increased and the braking is reduced as the steering is increased.

12. The system according to claim 11 wherein the optimal braking is between 0.2 and 0.4 g.

13. The system according to claim 10 wherein the means for providing both automatic steering and braking only provides automatic steering if the speed of the host vehicle is above a predetermined minimum vehicle speed.

14. The system according to claim 13 wherein the predetermined minimum vehicle speed is based on the coefficient of friction of the roadway.

* * * * *